Sept. 21, 1965  J. R. KLAGUES  3,207,179
GAUGE SAVER
Filed Nov. 23, 1962
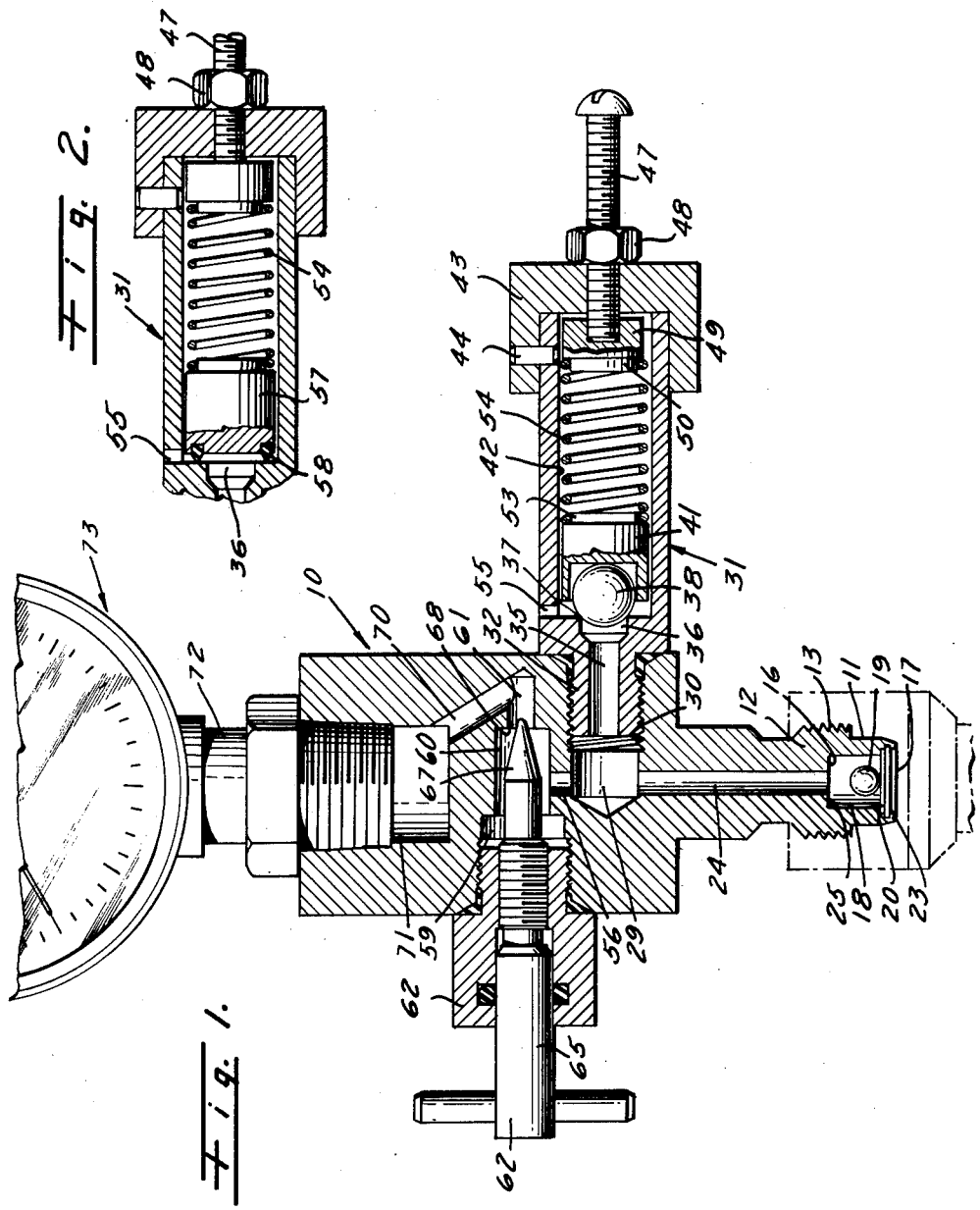
Joseph Robert Klagues,
INVENTOR.
WHANN & McMANIGAL
Attorneys for Applicant
by Robert M. McManigal

United States Patent Office 3,207,179
Patented Sept. 21, 1965

3,207,179
GAUGE SAVER
Joseph Robert Klagues, San Gabriel, Calif., assignor to Schulz Tool and Manufacturing Co., San Gabriel, Calif., a corporation of California
Filed Nov. 23, 1962, Ser. No. 239,590
2 Claims. (Cl. 137—612.1)

This invention relates to a device to prevent excessive pressures from passing through a line and, more particularly, to a device to prevent excessive pressures from being applied to a pressure gauge.

Pressure gauges are usually constructed so that when the pressure applied to the gauge is somewhat greater than the upper limit which the gauge indicates, the gauge is destroyed. The problem of destroying gauges by excessive pressures is of particular importance in the testing and development of equipment in which fluid pressures are usually not readily limitable to the range of a gauge which is designed to give accurate readings within the said range.

It is an object of this invention to provide a device to prevent excessive pressures from being permitted to enter a line downstream of the device.

It is another object of the invention to provide an improved gauge saver.

It is still another object of the invention to provide a gauge saver in which the pressure is automatically shut off to the gauge when the pressure in the line to the latter exceeds a predetermined amount.

It is a further object of the present invention to provide an improved gauge saver which is simple and economical to manufacture.

It is a still further object of the present invention to provide a gauge saver in which there are a minimum of moving parts and in which the moving parts are easily replaceable.

Further objects and advantages of the invention may be brought out in the following part of the specification wherein small details have been described for the competence of disclosure, without intending to limit the scope of the invention which is set forth in the appended claims.

Referring to the accompanying drawings, which are for illustrative purposes only:

FIG. 1 is an elevational, cross sectional view of a gauge saver having its lower end connectable to a fluid pressure source and having a gauge, shown fragmentarily, threadedly engaged in its upper end; and FIG. 2 is a fragmentary cross sectional view of another embodiment of a relief valve shown in FIG. 1.

The gauge saver shown in the drawing has an elongated body, generally designated as 10. At the lower end 11 of the body, there is a small diameter portion 12 having male threads 13 which are adapted to be threadedly engaged in a female fitting, shown in phantom outline, of a fluid pressure source.

Centrally, at the lower end 11, there is an opening or inlet 17. Inwardly of the opening 17 is a cylindrical bore 18 having therein a ball check valve 19. The ball 19 is shown resting upon a screen 20 which permits the passage of fluid therethrough and which confines the ball to the bore 18. The screen 20 is retained within the body by a snap ring 23. Extending inwardly of and downstream from the bore 18 is a small diameter passage portion 24 which forms a part of the passage through the body 10. At the outer end of the passage portion 24, at the inner end surface 25 of the bore, is a circular seat 26 for the check valve 19. The diameters of the ball 19 and of the bore 18 are such so that the center of the ball will at all times be in alignment with the passage portion 24 to provide easy seating of the ball on the seat 26.

Extending inwardly of the passage portion 24 and in communication therewith is a transverse bore 29 extending inwardly from a surface of the body and having its outer portion threaded as at 30. A relief valve housing, generally designated as 31, has an inner end 32 threadedly and sealingly engaged with the body 10. In the inner end 32 is a passage 35 terminating in an enlarged diameter cylindrical bore 36 which forms a seat 37 for ball relief valve 38.

The relief valve 38 is fitted within a cup 41, loosely and slidably engaged within a cylindrical portion 42 of the housing 31. The outer end of the cylinder 42 is enclosed with a cap 43, held in place by spring pins or screw means 44. Extending into the cylindrical portion 42 and threadedly engaged in the outer wall of the cap 43 is an adjustment screw 47 having a locking nut 48 in locking position in abutment with the outer wall of the cap 43. The inner end of the screw 47 extends into a cylindrical block 49, loosely fitted within the cylindrical portion. The inner ends of the block 49 and the cup 41 have small diameter portions 50 and 53, respectively, around which the opposite ends of coiled spring 54 are fitted. The spring 54 is adjusted by means of the screw 47 to apply a predetermined pressure on the relief valve 38 so that the valve will be lifted whenever the pressure upstream thereof in the passage portion 24 and the passage 35 exceeds the pressure of the spring upon the cup 41. When the valve 38 is lifted, the fluid within the body 10 is permitted to escape past the valve and out of the relief valve housing through a discharge opening 55 extending through the wall of the cylindrical portion 42.

In FIG. 2 there is an alternate embodiment of the relief valve in the form of a cylinder 57 having an annular elastomeric seal 58 which seats on the surface surrounding the bore 36 in the housing 31.

Downstream of or upwardly from the bore 29 extends a short passage 56 in communication with three successively smaller diameter transverse bores 59, 60 and 61. Threadedly and sealingly engaged in bore 59 is a snubber or needle valve bonnet 62. Extending through and threadedly engaged in the bonnet is a valve stem 65 having a handle 66 at its outer end and a needle valve 67 at its inner end. The valve 67 is adapted to close on a seat 68 formed at the inner end of the bore 61.

From the outer transverse end of the bore 61 extends a passage 70 terminating in outlet 71 of the body 10 in which a stem 72 of fluid pressure gauge 73 is threadedly engaged. As may be seen from the foregoing, when the needle valve 67 is open, the inlet 17 is in communication with the outlet 71 and the gauge so that the latter will indicate the pressure from the fluid pressure source. The valve 67 is provided to shut off the passage through the gauge saver body 10 when the gauge is removed and, further, is provided to dampen the pressure pulsation to the gauge so as to prevent surges therein.

In operation, when the fluid under pressure is first communicated to the inlet 17 and the bore 18 of the gauge saver body 10, the ball 19 may tend to seat and shut off the fluid to the passage 24. So as to unseat the ball in such a circumstance, the ball and seat are made so that there will be a slight leak which will permit the pressure to equalize on both sides of the ball to unseat the latter and to permit the fluid to enter the gauge where the pressure will be registered in pounds per square inch, for example. During normal operation, after the ball is unseated, there will be no further flow around it or through the body 10, as the fluid will remain substantially static even though the pressure is changed.

If the pressure in the gauge saver exceeds the setting on the relief valve 38, that is, is greater than the force of the spring holding the valve closed, the valve is unseated to permit a flow of fluid past it and out of the discharge passage 55 into the atmosphere. This flow reduces the pressure within the body 10 so that the pressure on the lower portion of the ball check valve is greater than on the upper portion thereof. The result of this, since the center of the ball is always in alignment with the passage 24, is that the fluid flow causes the check valve to engage its seat and shut off the supply of fluid to the gauge, thus preventing a fluid pressure in the gauge in excess of that of the relief valve setting.

It is desirable that as little fluid as possible be permitted to escape through the discharge 55 so that the latter opening is smaller than the fluid passages from the pressure source to the body 10. Thus, the fluid supply is greater than that that can be discharged to the atmosphere, and if there were no check valve, excessive pressure would be permitted in the gauge even if the relief valve was lifted. Thus, the check valve is necessary to prevent more fluid under excessive pressure from passing into the body than can be discharged through the opening 55 when the relief valve is lifted.

After the relief valve is lifted and the check valve is seated, to again connect the line pressure to the gauge, the pressure is reduced so that the check valve will drop into its open position on the screen 20. That is, the check valve will open after the relief valve closes and the pressure is equalized on both sides of the latter. The parts will then function to permit the gauge to register in a normal way until an excessive pressure is applied to the relief valve.

The invention and its attendant advantages will be understood from the foregoing description and it will be apparent that various changes may be made in the form, construction and arrangement of the parts of the invention without departing from the spirit and scope thereof or sacrificing its material advantages, the arrangement hereinbefore described being merely by way of example, and we do not wish to be restricted to the specific form shown or uses mentioned, except as defined in the accompanying claims, wherein various portions have been separated for clarity of reading and not for emphasis.

I claim:
1. A gauge saver comprising:
   (a) a body;
   (b) a passage through said body;
   (c) an inlet to said passage in said body and connectable to a source of fluid pressure;
   (d) an outlet to said passage in said body and connectable to a pressure gauge;
   (e) a relief valve housing secured to said body;
   (f) a relief valve in said housing in communication with said passage intermediate of said inlet and said outlet to discharge fluid pressure from said passage when the pressure in the passage exceeds a predetermined amount at which the relief valve opens;
   (g) an enlarged diameter bore forming a part of said passage upstream of said relief valve;
   (h) a portion of said passage immediately downstream of said bore and at one end thereof being of smaller diameter than said bore;
   (i) an unsecured ball check valve having freedom of movement within said bore and having a larger diameter than said portion of said passage, the diameters of said ball and said bore being such so that the center of said ball is at all times in alignment with said portion of said passage immediately downstream of said bore;
   (j) screen means at the other end of said bore between the latter and said inlet to confine said ball to said bore;
   (k) a ball valve seat at said one end in said bore and around the end of said smaller diameter passage portion for said ball to shut off said passage when said relief valve opens at said predetermined fluid pressure and the resultant flow through said bore carries said ball to said seat, said ball being normally off said seat and being normally supported on said screen, said bore and said seat being normally positioned so that said ball will gravitate toward said screen and away from said seat when the pressures on both sides of said seat are equalized;
   (l) a slight leak between said ball valve and said seat sufficient to permit equalization of pressures upstream and downstream of said seat when said ball is thereon and said relief valve is closed but not when said relief valve is open; and
   (m) a shutoff valve in said passage downstream of said relief valve to close the passage to said outlet.
2. The invention according to claim 1 in which:
   (a) the shutoff valve is a needle valve provided to dampen pressure pulsation to a gauge in the outlet.

References Cited by the Examiner
UNITED STATES PATENTS

| | | | |
|---|---|---|---|
| 643,876 | 2/00 | Lane | 73—392 XR |
| 1,291,401 | 1/19 | Caren | 137—612.1 XR |
| 1,996,060 | 4/35 | Bijur | 184—7 |
| 2,216,374 | 10/40 | Martin | 73—395 |
| 2,241,573 | 5/41 | Aschenbach | 251—127 |
| 2,502,525 | 4/50 | Krugler | 137—513.3 |
| 2,867,234 | 1/59 | Billington | 137—505.11 |

FOREIGN PATENTS

| | | |
|---|---|---|
| 240,586 | 11/11 | Germany. |
| 824,709 | 12/51 | Germany. |

LAVERNE D. GEIGER, *Primary Examiner.*